US008609211B2

(12) United States Patent
Boucher et al.

(10) Patent No.: US 8,609,211 B2
(45) Date of Patent: Dec. 17, 2013

(54) LABEL THAT IS REMOVABLE OR HAVING A REMOVABLE SECTION

(75) Inventors: Steve Boucher, Iron Mountain, MI (US); Wally Zychowski, Norway, MI (US); Tom Renier, Vulcan, MI (US)

(73) Assignee: Multi-Color Corporation, Batavia, OH (US)

( * ) Notice: Subject to any disclaimer, the term of this patent is extended or adjusted under 35 U.S.C. 154(b) by 269 days.

(21) Appl. No.: 12/433,207

(22) Filed: Apr. 30, 2009

(65) Prior Publication Data

US 2010/0159194 A1 Jun. 24, 2010

Related U.S. Application Data

(60) Provisional application No. 61/139,283, filed on Dec. 19, 2008.

(51) Int. Cl.

*B32B 9/04* (2006.01)
*B32B 33/00* (2006.01)
*G09F 3/10* (2006.01)

(52) U.S. Cl.

USPC .......... 428/40.1; 428/41.7; 428/42.1; 283/72; 283/98; 283/100; 40/299.01; 40/306; 40/310

(58) Field of Classification Search

USPC ........... 428/40.1, 41.7, 42.1, 343; 283/72, 98, 283/100; 40/299.01, 306, 310

See application file for complete search history.

(56) References Cited

U.S. PATENT DOCUMENTS

| | | | | |
|---|---|---|---|---|
| 3,409,449 | A * | 11/1968 | Coney et al. | 106/31.73 |
| 4,479,838 | A | 10/1984 | Dunsim et al. | |
| 4,567,098 | A * | 1/1986 | Becker et al. | 428/327 |
| 4,818,588 | A * | 4/1989 | Okabe et al. | 428/201 |
| 4,987,118 | A * | 1/1991 | Murata et al. | 503/200 |
| 5,172,936 | A | 12/1992 | Sullivan et al. | |
| 5,238,720 | A * | 8/1993 | Volkman | 428/41.3 |
| 5,418,008 | A | 5/1995 | Calvert | |
| 6,641,876 | B2 | 11/2003 | Amrine | |
| 6,709,726 | B1 | 3/2004 | Dronzek, Jr. et al. | |
| 6,921,453 | B2 | 7/2005 | Dronzek, Jr. et al. | |
| 6,991,261 | B2 | 1/2006 | Dronzek, Jr. et al. | |

* cited by examiner

*Primary Examiner* — Patricia Nordmeyer

(74) *Attorney, Agent, or Firm* — Wood, Herron & Evans, LLP

(57) ABSTRACT

A label that is removable from the article with which it is associated, or includes a removable section thereof, and includes only a single substrate. The substrate has a front side and a back side, and an ink disposed on the back side of the substrate, which remains with the substrate during removal of the substrate, or a section thereof, from an article. The label further includes an abhesive disposed adjacent the ink on the back side of the substrate. The label may have at least one set of perforations to provide a removable section of the label. These perforations may be provided by an apparatus for providing consistent perforations.

22 Claims, 8 Drawing Sheets

LABEL THAT IS REMOVABLE OR HAVING A REMOVABLE SECTION

CROSS-REFERENCE TO RELATED APPLICATIONS

This application claims the benefit of the filing date of U.S. Patent Application Ser. No. 61/139,283, entitled "Label that is Removable or Having a Removable Section," filed on Dec. 19, 2008, the disclosure of which is incorporated by reference herein in its entirety.

FIELD OF THE INVENTION

The present invention relates generally to labels that are associated with various articles, and relates more specifically to a label that is removable from the article with which it is associated, or has a section that is removable from the article with which the label is associated.

BACKGROUND

This section is intended to introduce the reader to various aspects of art that may be related to various aspects of the present invention, which are described and/or claimed below. This discussion is believed to be helpful in providing the reader with background information to facilitate a better understanding of various aspects of the present invention. Accordingly, it should be understood that these statements are to be read in this light, and not as admissions of prior art.

Articles, such as containers, are prevalent in a wide variety of shapes and sizes for holding many different kinds of materials such as cosmetics, cleaning supplies, foodstuffs, beverages, light duty liquids, heavy duty liquids, etc. Such articles may be fabricated from plastic (e.g., polypropylene, polyethylene, and polyesters), glass, paperboard, cardboard, or other materials.

Regardless of the material, such articles are often provided with a label thereon, having text, logos, graphics, decorations, and/or other indicia that provide a consumer with information about the article and its contents. For example, this label information may include the trade name of the product, the producer of the product, ingredients, price, and/or other such information. In some instances, the label is associated with a surface of the article by means of an adhesive or the like. For example, one such type of label is a pressure-sensitive label. As is known to those skilled in the art, a pressure-sensitive label generally includes a substrate having indicia providing label information printed on one side thereof, and a pressure-sensitive adhesive applied on the opposite side thereof. The pressure-sensitive adhesive forms a bond between the label and an article when pressure is applied in order to adhere the label to the article.

The label information described above is generally situated on the label such that it is visible to a consumer when the label is associated with an article. However, in addition to the label information described above, certain labels may also include other information (in the form of text, logos, graphics, decorations, and/or other indicia), which may not be visible to the consumer when the label, or a section thereof, is associated with the article. Game-type information is an example of this sort of information. Game-type information may be included on the back side of the label (i.e., the nonvisible side). Another exemplary type of information that may be printed on the back side of a label includes coupon-type information. In order to be viewed, the label, or a section thereof, may be removed from the article, thereby exposing the game-type, coupon-type, or other type of information. Thus, it is desirable that the label, or a section of the label, be removable. This allows any game-type information to be revealed and any winning game piece (i.e., removable section or removable label) to be redeemed. It also allows for any coupon to be removed and retained by the retailer, or saved by the consumer for later use.

Labels that are removable from an article, or have removable sections, are known. However, these labels exhibit several drawbacks. For example, these known labels often include two substrates (with the first substrate affixed to an article, and a second substrate—the removable substrate—overlying and affixed to the first substrate). More specifically, in these labels, the second substrate may have indicia on its back side, and the back side is adhered to the first substrate. The back side of the first substrate is then affixed to an article to be labeled through the use of adhesives. The first substrate is applied to the article with greater force of adhesion (i.e., a stronger bond) than the force of adhesion of the second substrate to the first substrate. Thus, the second substrate can be removed from the first substrate while the first substrate remains adhered to the article. However, the use of two substrates increases the bulk of the label. This results in increases in materials used, with attendant increases in cost to prepare and ship the labels. Further, multiple adhesives of differing strengths must be used, further increasing the materials and cost, and increasing the time, calculation, and design that must go into the label. Further, the use of a first adhesive to bond the second substrate to the first substrate results in a second substrate that may not be easily removable from the first substrate, and may tear, thereby damaging the indicia.

As another drawback, prior labels having indicia printed on the back side of the second substrate have had difficulty in retaining the ink of that indicia on the back side of the second substrate during removal. For example, the adhesive of these labels can split during removal, leaving adhesive on both surfaces (i.e., first and second substrates). Moreover, the bond of the adhesive may become greater on aging than the strength of the substrate, resulting in tearing of the substrate on attempting to peel the label or a section thereof. This results in tearing of one or both of the substrates, and often results in the transfer of indicia from one surface to another, which removes indicia from one substrate and adheres it, in an unwanted fashion, to the other substrate. This destroys the usefulness of any game piece or coupon or other information.

Further, the very use of an adhesive on the removable label or removable section thereof (whether in a flood application or patterned application) can increase the difficulty in removing the label or removable section thereof from a secondary substrate, or article. This also can result in tearing or destruction of any coupon or game piece.

Further, even when a section of a label is designed to be removable (such as by including a release layer), the adhesives used for the remainder of a label (such as the standard adhesives used on labels for beer bottles), create a strong enough bond that the removable section also becomes bonded, thereby destroying its function. For example, some labels having a removable section may include a release coating over at least the removable section. However, before that label is placed onto an article or other substrate, the back side of the label is exposed to a roller, which floodcoats an adhesive onto the back side of the label, and thus over any release coating. In these labels, it is hoped that the release coating will continue to allow removal of the section, even in view of the presence of the adhesive. However, the adhesives are generally stronger than the release coating and create a bond between the article and the removable section, even in the presence of a release coating. This results in a removable section exhibiting the same drawbacks described above (e.g., a section that cannot be removed, that tears, that doesn't retain ink, etc.).

Further still, any label including a removable section may include perforations to define the removable section, and facilitate removal of the section from the remainder of the substrate. In general, perforations are made by methods well known to those of ordinary skill in the art. For example, in one general method, an infeed roller directs a web of labels into a perforation apparatus, and a draw roller, disposed generally "downstream" from the infeed roller, pulls the web of labels through the perforation apparatus. Positioned between the infeed and draw rollers are one or more perforating wheels. The outer circumferential surface of each perforating wheel is provided with a plurality of "knives." Proximal to the perforating wheel or wheels is a secondary roller. A roller gap is thus formed between the perforating wheels and the secondary roller. The web of labels is stretched taut over the secondary roller and passes through this roller gap. The "knives" of the perforating wheels puncture or indent the web of labels as it passes, and the desired depth of the perforations can be controlled by controlling the pressure of the perforating wheel against the web of labels and secondary roller. For example, such pressure may be set using air pressure provided by a pneumatic cylinder.

However, there are drawbacks to these perforating apparatus that result in inconsistent perforations of poor quality. For example, the position of the perforating wheels relative to the secondary roller may be mechanically adjusted, but it is difficult to ensure that the pressure of the perforating wheels is constant during operation of the apparatus. Generally, a single air source provides the air for the pressure that is used for all of the perforating wheels in a perforating apparatus. Due to blockages that may arise within the system, the pressure may not be constant for each perforating wheel. Further, the wheels, pneumatic cylinders, or attachment of those two components may be different (due to different age, for example). Thus, the single air source may result in differing pressures in different perforating wheels. This leads to inconsistent perforations across a particular web of labels.

Further, during operation of a perforating apparatus, the pressure within the pneumatic cylinder itself may not be held constant. For example, variances in the operation of the apparatus may cause the pressure to fluctuate (i.e., increase or decrease) relative to the desired set pressure. All of the above can cause inconsistencies in perforations along each single line of perforations.

Further, in the perforating apparatus, the outer surface of the secondary roller is hard, as the rollers are generally made of a hard substance, such as steel. As described above, during a perforating operation, the web of labels moves against this hard surface as the "knives" of the perforating wheels puncture the labels. However, the hard surface of the secondary roller does not provide any "give," such that the knives may be stopped by the hard surface from puncturing the labels to the desired depth.

Any difference in pressure between the perforating wheels or within the pneumatic cylinder alters the depth, consistency, and quality of the perforations formed in the labels. This leads to labels with areas that are prematurely separated from the remainder of the label, labels that do not have a removable section at all (when they should), or labels with poorly functioning perforations (such that any attempted removal may tear the label where not intended).

SUMMARY

Certain exemplary aspects of the invention are set forth below. It should be understood that these aspects are presented merely to provide the reader with a brief summary of certain forms the invention might take and that these aspects are not intended to limit the scope of the invention. Indeed, the invention may encompass a variety of aspects that may not be explicitly set forth below.

The various exemplary aspects of the present invention, described below, overcome the drawbacks in present removable labels, and labels having a removable section, described in the Background. For example, one aspect provides a label that includes a single substrate that is removable from the article with which it is associated, or includes a removable section thereof, thereby eliminating excess layers, adhesives, etc., and lowering costs of the label.

Another aspect of the present invention provides a removable label, or a label including a removable section, which does not result tearing, splitting, or damage to the removed portion or transfer of any indicia from the back side of the substrate to any other surface. In one particular embodiment, the label includes a substrate having a front side and a back side, and an ink disposed on the back side of the substrate, wherein the formulation of the ink includes components chosen from nitrocellulose resin, maleic resin, rosin ester resin, phosphate plasticizer, and mixtures thereof. The ink also includes various pigments (depending on the particular colors desired). The ink is thus formulated with an amount of resin (and thus a ratio of resin to pigment), which differs from prior inks and is superior in its ability to remain with the substrate during removal of the substrate, or a section thereof, from an article.

A further aspect of the present invention provides a removable label, or a label including a removable section, including a substrate having a front side and a back side (wherein the substrate is adapted to receive ink on the front side and the back side), with a first abhesive layer disposed proximal to the back side, and a second abhesive layer disposed adjacent to the first abhesive layer. By use of the first and/or second abhesive layers, the label or section thereof can be easily removed from an article (as opposed to prior labels, which used some adhesives between substrates, resulting in tearing and unwanted transfer of ink).

A further aspect of the present invention provides a label having at least one set of perforations to provide a removable section of the label. In this aspect, each perforation of the set of perforations exhibits substantially consistent features (e.g., size, shape, depth, etc.) as compared to the other perforations of the set of perforations. Further, this aspect of the present invention provides a label having a plurality of sets of perforations wherein each perforation of the plurality of sets of perforations exhibit substantially consistent features (e.g., size, shape, depth, etc.) as compared to the other perforations of all the plurality of sets of perforations.

A further aspect of the present invention provides an apparatus for providing consistent perforations within a set of perforations, and consistent sets of perforations, one to another. The apparatus does so, for example, by providing individualized air sources for each of a plurality of pneumatic cylinders, by providing at least one breather vent to reduce and eliminate fluctuations in pressure within a pneumatic cylinder, and by providing a secondary roller including a peripheral surface, or substance thereon that allows for travel of the knives of a perforating wheel beyond its outer surface.

BRIEF DESCRIPTION OF THE FIGURES

Various features and advantages of the aspects of the present invention will become better understood when the following detailed description is read with reference to the accompanying figures in which like characters represent like parts throughout the figures, wherein.

DETAILED DESCRIPTION OF EXEMPLARY EMBODIMENTS

Figure 2:
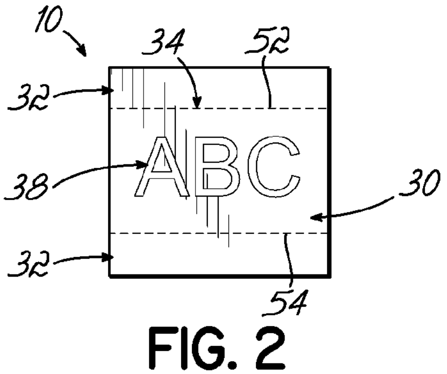
FIG. 2 is a top view of the exemplary embodiment of the label of FIG. 1.

One or more embodiments of the present invention will be described below. In an effort to provide a concise description of these embodiments, not all features of an actual implementation may be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The various exemplary aspects of the present invention, described below, overcome the drawbacks in present removable labels, and labels having a removable section, described in the Background. For example, one aspect provides a label that includes a single substrate that is removable from the article with which it is associated, or includes a removable section thereof, thereby eliminating excess layers, adhesives, etc., and lowering costs of the label.

Another aspect of the present invention provides a removable label, or a label including a removable section, which does not result tearing, splitting, or damage to the removed portion or transfer of any indicia from the back side of the substrate to any other surface. In one particular embodiment, the label includes a substrate having a front side and a back side, and an ink disposed on the back side of the substrate, wherein the formulation of the ink includes components chosen from nitrocellulose resin, maleic resin, rosin ester resin, phosphate plasticizer, and mixtures thereof. The ink also includes various pigments (depending on the particular colors desired). The ink is thus formulated with an amount of resin (and thus a ratio of resin to pigment), which differs from prior inks and is superior in its ability to remain with the substrate during removal of the substrate, or a section thereof, from an article.

A further aspect of the present invention provides a removable label, or a label including a removable section, including a substrate having a front side and a back side (wherein the substrate is adapted to receive ink on the front side and the back side), with a first abhesive layer disposed proximal to the back side, and a second abhesive layer disposed adjacent to the first abhesive layer. By use of the first and/or second abhesive layers, the label or section thereof can be easily removed from an article (as opposed to prior labels, which used some adhesives between substrates, resulting in tearing and unwanted transfer of ink).

A further aspect of the present invention provides a label having at least one set of perforations to provide a removable section of the label. In this aspect, each perforation of the set of perforations exhibits substantially consistent features (e.g., size, shape, depth, etc.) as compared to the other perforations of the set of perforations. Further, this aspect of the present invention provides a label having a plurality of sets of perforations wherein each perforation of the plurality of sets of perforations exhibit substantially consistent features (e.g., size, shape, depth, etc.) as compared to the other perforations of all the plurality of sets of perforations.

A further aspect of the present invention provides a label including a substrate having a front side and a back side (wherein the substrate is adapted to receive ink on the front side and the back side), including a removable section defined by at least one set of perforations, with at least one abhesive layer disposed proximal to the back side of the substrate and substantially in register with the removable section. This aspect may further provide a second abhesive layer disposed adjacent to the first abhesive layer and substantially in register with the removable section.

A further aspect of the present invention provides an apparatus for providing consistent perforations within a set of perforations, and consistent sets of perforations, one to another. The apparatus does so, for example, by providing individualized air sources for each of a plurality of pneumatic cylinders, by providing at least one breather vent to reduce and eliminate fluctuations in pressure within a pneumatic cylinder, and by providing a secondary roller including a peripheral surface, or substance thereon that allows for travel of the knives of a perforating wheel beyond its outer surface.

There are several varieties of labels (e.g., pressure sensitive, shrink sleeve, heat transfer, in-mold, etc.). The description below and the Figures describe and show a pressure sensitive label. However, those of ordinary skill in the art will recognize that the present invention is not necessarily limited to pressure sensitive labels, but may include other label types.

As can be seen from the Figures, the label includes a plurality of layers. And certain of those layers may be common to the various embodiments described herein. Referring particularly to FIGS. 1-7, the label 10 includes a substrate 12 having a front side 14 and a back side 16, a first ink layer 18 disposed on or proximal to the front side 14 of the substrate 12, a second ink layer 20 disposed on or proximal to the back side 16 of the substrate 12, and a first abhesive layer 22 disposed on or proximal to the second ink layer 20. Disposed "on," as used herein, means that there is direct contact between the various layers (such as the substrate 12 and the first ink layer 18 or second ink layer 20). Disposed "proximal to," as used herein, means that although a particular layer may be positioned relative to a particular surface (e.g., that the first ink layer 18 is positioned near the front side 14 of the substrate 12), it is not necessary that there be any direct contact between the layer and the surface (e.g., the first ink layer 18 and the front side 14 of the substrate 12), although there may be. For example, another layer, or layers, may be disposed between the first ink layer 18 and the front side 14 of the substrate 12 such that the first ink layer 18 would then be disposed "proximal to" the front side 14 of the substrate 12.

Further, various embodiments of the label 10 of the present invention may include additional layers to those referenced above. These include a protective layer 24 disposed on or proximal to the first ink layer 18 (on a side of the first ink layer 18 that is opposite the substrate 12), and a second abhesive layer 26 (see particularly FIG. 7) disposed on or proximal to the first abhesive layer 22 (on a side of the first abhesive layer 22 that is opposite the second ink layer 20).

The label 10 may be adapted to be removed from an article 28 with which it is associated. As used herein, "associated with" means that the label 10 is adhered to, affixed to, joined, connected, merged, fastened, secured, or otherwise cooperative with the article 28. Alternatively, the label 10 may include a removable section 30, which is adapted to be removed from the article 28 with which the label 10 is associated, while leaving a remainder section or sections 32 of the label 10 with the article 28. Such a removable section 30 may be defined by, and/or its removal may be facilitated by, at least one set of perforations 34, as will be described in greater detail below.

Turning now to the various layers of the label 10 which may be present in various embodiments: In general, the label 10 includes a single substrate 12 having a front side 14 and a back side 16. The front side 14 is the side that is visible when the label 10 is associated with an article 28, and the back side 16 may not be visible when the label 10 is associated with an article 28. The back side 16 of the substrate 12 is generally opposite the front side 14. As is known to those skilled in the art, a coating 36 suitable for printing high quality graphics may be applied (or have been applied) to a side of the substrate, such that the front side 14 exhibits this coating 36. Such substrates are known in the art as "coated-one-side" or "C1S" substrates. Such coatings 36 are usually applied in two steps. First, a base coat is applied, and then a top coat is applied over the base coat. Compositionally, coatings 36 useful for printing high quality graphics generally include a fluidized blend of minerals such as coating clay, calcium carbonate, and/or titanium dioxide with a suitable binder such as starch, polyvinyl alcohol, polystyrene, or the like.

Further, the substrate 12 may be chosen from a full wet strength paper and a full wet strength metalized paper. As is known to those of ordinary skill in the art, the ability of paper products to maintain a substantial proportion of their original strength after being completely saturated with aqueous solution is known as wet strength. Sometimes the criterion for defining a wet strength grade of paper is that the ratio of wet to dry tensile or burst strength is at least 10% or 15%. The primary means of increasing the wet strength of paper consists of reactive, polymeric chemicals. Most prominent among wet strength additives is the family of polyamidoamine-epichlorohydrin resins.

Thus, the substrate 12 of the label 10 may be a single ply C1S substrate. In particular embodiments, the single ply C1S substrate 12 may be coated-one-side paper (such as a clay coated paper) or a one-side metalized paper. A first indicia 38 may be printed on the coated (e.g., clay coated or metalized) side of the C1S substrate 12 (i.e., the front side 14 of the substrate 12), and a second indicia 40 may be printed on the uncoated side of the C1S substrate 12 (i.e., the back side 16 of the substrate 12).

The first indicia 38 may be formed from one or more inks that make up the first ink layer 18. The first ink layer 18 may be disposed on or proximal to the front side 14 of the substrate 12. In one particular embodiment, the first ink layer 18 may be printed on the front side 14 of the substrate 12. The ink of the first ink layer 18 may be printed in the form of indicia 38 such as text, graphics, and/or other decorations, and may be used to provide label information, for example. As is known to those of ordinary skill in the art, the ink (or inks) of the first ink layer 18 is a liquid containing various pigments and/or dyes that is applied to a surface (such as the front side 14 of the substrate 12) to produce indicia (i.e., text, images, graphics, designs, etc.). In general, the ink or inks may include solvents, pigments, dyes, resins, lubricants, solubilizers, surfactants, particulate matter, fluorescers, and other materials (though it is not necessary that all of these materials be present in all inks). Two general types of inks are pigmented inks and dye-based inks. Certain embodiments of the label include a pigmented ink or inks. Further, as is known to those of ordinary skill in the art, pigmented inks contain further agents that ensure adhesion of the pigment to the surface, which prevent the ink from being removed by mechanical abrasion. These agents are typically referred to as resins in solvent-based inks.

A second ink layer 20 may be disposed on or proximal to the back side 16 of the substrate 12. In one particular embodiment, the second ink layer 20 may be printed on the back side 16 of the substrate 12. The ink of the second ink layer 20 may be printed in the form of indicia 40, such as text, graphics, and/or other decorations, to provide label information, such as for a coupon or game piece, for example. And so, generally, the second ink layer 20 will be printed on the back side 16 of the substrate 12 at a location that is designed to be removable from the label 10, leaving the remainder section or sections 32 (in embodiments that include a removable section 30 of the label 10). However, those of ordinary skill in the art will recognize that the second ink layer 20 is not limited to being disposed on or proximal to only the removable section 30 of the label. Thus, once the label 10, or removable section 30 thereof, is removed, the second ink layer 20 (and the second indicia 40) can be viewed.

In one aspect of the present invention, the ink or inks of the second ink layer 20 are disposed on or proximal to the back side 16 of the substrate 12 (or a removable section 30 thereof) and are formulated to transfer along with the removable label, or removable section 30 of the substrate 12 (e.g., of metalized paper). Such substrates are commonly used for labels, and are well known to those of ordinary skill in the art. This eliminates the above-described problem with prior inks not transferring completely or effectively with a removable label or removable section thereof, (such as when a second substrate is separated from a first substrate).

To accomplish this complete transfer, the ink or inks applied to the back side 16 of the substrate 12 as the second ink layer 20 is of a formulation that provides greater adhesion to the substrate 12 (e.g., a one-side metalized paper). The formulation of the ink of the second ink layer 20 includes, in one embodiment, a nitrocellulose resin, a maleic resin, a rosin ester resin, a phosphate plasticizer, and pigments. The pigments provide the color for the ink, and the remaining components (i.e., resins and plasticizer) provide the vehicle for the pigments. The pigments that are added to the formulation of the ink of the second ink layer 20 of the present invention may be chosen based on the particular color or colors desired. In one particular embodiment, pigments may include black pigment (commercially available from Flint Group, of Lebanon, Ohio), rubine red pigment, and HR yellow pigment (rubine red and HR yellow are commercially available from INX International of West Chicago, Ill.). For example, a particular black ink available from Flint Group, of Lebanon Ohio, is TMK40200, which has a formulation of 1-5% phosphate plasticizer, 4-8% rosin ester resin, and 15-20% N/C black chip. As will be recognized by those of ordinary skill in the art, this ink is merely exemplary of inks that may be used in the various aspects of the present invention. The ink, as described above, is of a formulation that provides greater adhesion to the back side 16 of the substrate 12, thereby preventing removal, transfer, etc. of the second ink layer 20 from the back side 16 of the substrate 12. This is accomplished by formulating the resin content and amount. One particular embodiment of an ink may include a formulation of nitrocellulose resin, maleic resin, rosin ester resin, and a phosphate plasticizer, to form a vehicle for the pigments of the ink, wherein this vehicle comprises 73% of the ink composition. The components of the vehicle are commercially available from Flint Group, of Lebanon, Ohio. For example, a particular vehicle available from Flint Group, of Lebanon Ohio, is TMW-96341, which has a formulation of 10-15% nitrocellulose, 1-5% phosphate plasticizer, and 20-30% maleic resin. As will be recognized by those of ordinary skill in the art, this vehicle is merely exemplary of vehicles that may be used in the various aspects of the present invention. The remaining portion of the ink may include a pigment or pigments selected for various desired color or colors. In one particular embodiment, the ink composition includes 3% rubine red pigment, 22% HR yellow pigment, and 2% black pigment. While the pigments of this particular embodiment are described as black, rubine red, and HR yellow, it will be recognized by those of ordinary skill in the art that these pigments may be used in any combination, and any other pigments of any other combination or alone may be used, based on the desired colors to be used for various indicia (text, graphics, logos, decorations, etc.). The particular pigments recited above are not necessary.

As described above, the ink or inks of the second ink layer 20 are formulated to completely transfer with the label 10, or a removable section 30 thereof, once the label 10, or removable section 30, is removed from the article 28. As described in the Background, many inks cannot completely transfer. Also, as pigmented inks remain on the surface to which they are applied (as opposed to dye-based inks), they are more susceptible to mechanical abrasion due to the removal process (and thus separation from the back side 16 of the substrate 12). Thus, the vehicle of the ink, and particularly the resin components thereof, are formulated (and increased in content) to provide greater adhesion of the ink (and thus complete transfer) while still allowing for high quality of indicia.

The ink that is applied as the second ink layer 20 to the back side 16 of the substrate 12 may also be applied as the first ink layer 18 on the front side 14 of the substrate 12. Alternatively, other inks may be applied as the first ink layer 18 (as the ink of the first ink layer 18 may not be subjected to the same mechanical abrasion during the removal process). The ink of the first ink layer 18 thus may include a conventional polyamide inks, or other standard inks. The first and second ink layers 18, 20 may be disposed on or proximal to the substrate 12 in a conventional manner by depositing, by gravure printing, or the like, the ink composition or compositions onto one or more desired areas. For example, the labels may be printed both offset and rotogravure on paper, metalized paper, and metalized film.

Although in this embodiment, the label 10 is described as having a first ink layer 18, a C1S substrate 12 (e.g., metalized paper), and a second ink layer 20, those of ordinary skill in the art will recognize that there does not necessarily need to be a first ink layer 18 disposed on the coated (e.g., metalized) front side 14 of the substrate 12. In other words, labels including indicia only in the form of an ink layer on the back side 16 of the substrate 12 are also contemplated.

At least one layer of an abhesive (referred to herein as the "first abhesive layer" 22) may be disposed on or proximal to the second ink layer 20 (on the side of the second ink layer 20 that is opposite the back side 16 of the substrate 12). In one particular embodiment, the first abhesive layer 22 may be disposed on the second ink layer 20. As is known to those of ordinary skill in the art, abhesive compositions are used for coating various materials in order to decrease the tendency of those materials to adhere to other surfaces. Abhesive coating compositions are used, for example, to coat paper, films, or sheets, which are used as backing for pressure-sensitive labels (i.e., carrier sheets from which labels are removed prior to application to an article).

In the present aspect of the invention, the first abhesive layer 22 is used to prevent the label 10, or removable section 30 thereof, from adhering to the article 28. Thus, in embodiments including a removable section 30, the first abhesive layer 22 may be printed generally in substantial registry with the removable section 30 of the substrate 12. However, in alternate embodiments, the abhesive may be printed over the entire label 10. Further, the first abhesive layer 22 may be flood coated or may be applied in a pattern (i.e., other than a flood coating).

In one particular embodiment, the abhesive of the first abhesive layer 22 includes a polyamide resin, polyether modified dimethylpolysiloxane, polyethylene wax, and paraffin wax. One such abhesive is Abseal™, commercially available from Flint Group, of Lebanon, Ohio. For example, a particular abhesive formulation available from Flint Group, of Lebanon Ohio, is TMW95387, which has a formulation of 30-40% polyamide resin, 0.5-1% PE wax, 1-5% parrifin wax, and 0.5-1% polyether modified dimethylpolysiloxane. As will be recognized by those of ordinary skill in the art, this abhesive is merely exemplary of abhesives that may be used in the various aspects of the present invention. As described above, many prior labels having removable sections exhibit difficulty in removing the removable section from a secondary substrate. Even prior use of certain abhesives has proven unsuccessful, because, as described above, certain applications (such as the standard adhesives used on beer bottles) provide a bond of such strength that the removable section becomes bonded, even in the presence of an abhesive. This is because once a label with an abhesive on a back side of a removable section is prepared, the back side of the entire label will be flood coated, or pattern coated, with an adhesive prior to application. Thus, this adhesive, which bonds the entire label to another surface, also overlies the abhesive coated removable section of the label. Prior abhesives have not exhibited the feature of being able to break free from those adhesives to allow the removable section to be removed. However, the abhesive includes components (polyamide resin, polyether modified dimethylpolysiloxane, polyethylene wax, paraffin wax) that allows the label, or a removable section thereof, to break free from any bond provided by adhesives (including the very strong adhesives used, for example, with beer bottles). The abhesive may also be of an amount that facilitates removal of the label, or a removable section thereof. The first abhesive layer 22, in one embodiment, may be present in an amount in a range of 1.25-1.75 lbs./ream.

Figure 3:
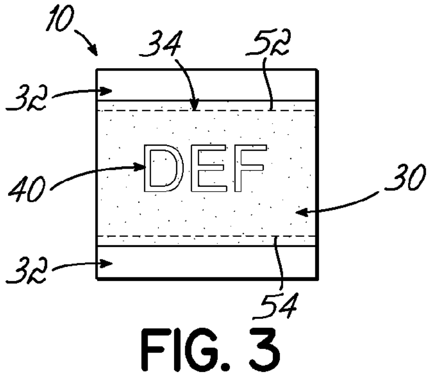
FIG. 3 is a bottom view of the exemplary embodiment of the label of FIG. 1.
Figure 1:
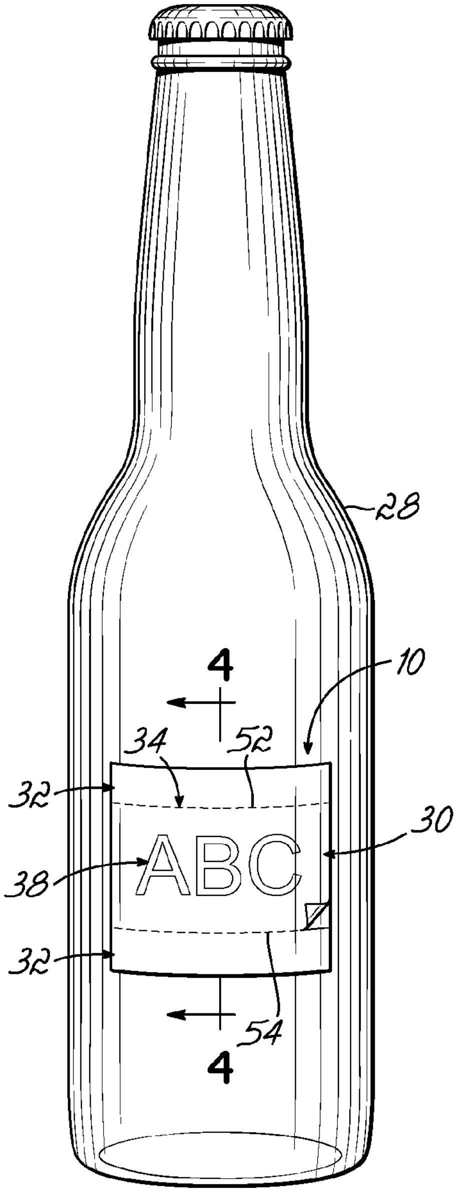
FIG. 1 is a perspective view of an exemplary embodiment of a label having a removable section associated with an outer surface of an article in accordance with aspects of the present invention.
Figure 4:
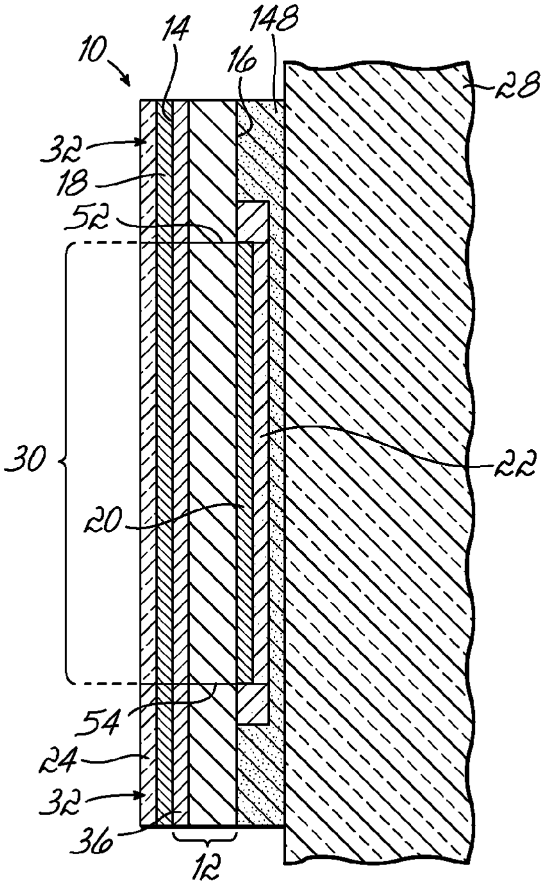
FIG. 4 is a cross-sectional view of the exemplary embodiment of the label of FIG. 1, taken along line 4-4 of FIG. 1.
Figure 5:
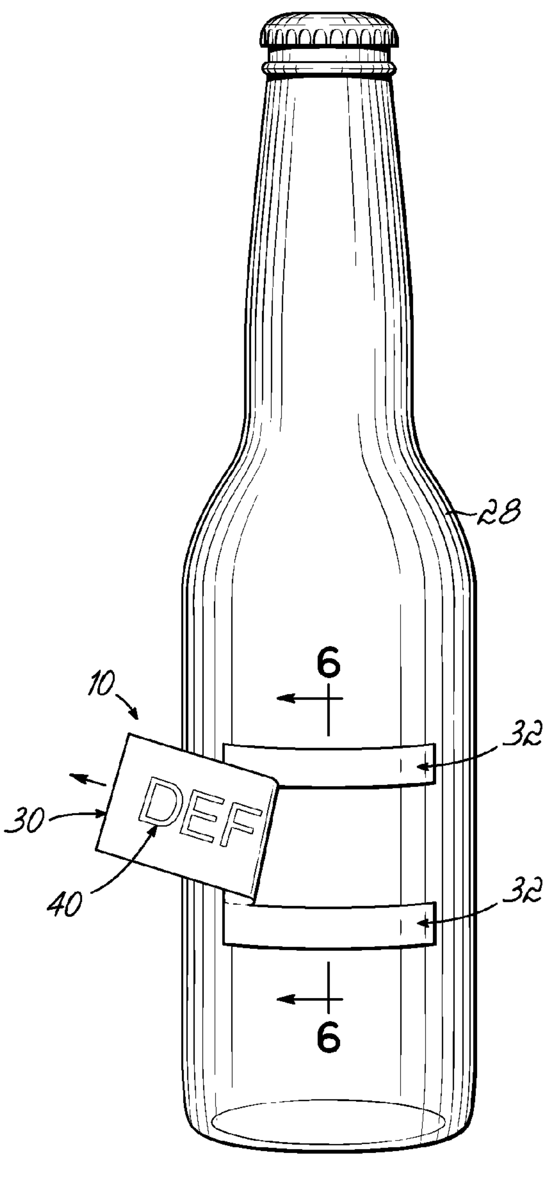
FIG. 5 is a perspective view of the exemplary embodiment of the label of FIG. 1, depicting the removable section of the label being removed from the article with which it is associated.
Figure 6:
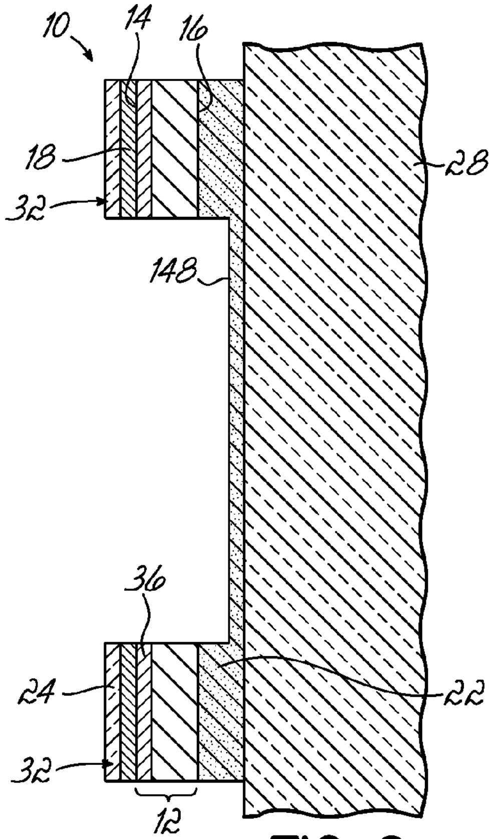
FIG. 6 is a cross-sectional view of the exemplary embodiment of the label of FIG. 1, taken along line 6-6 of FIG. 5.
Figure 7:
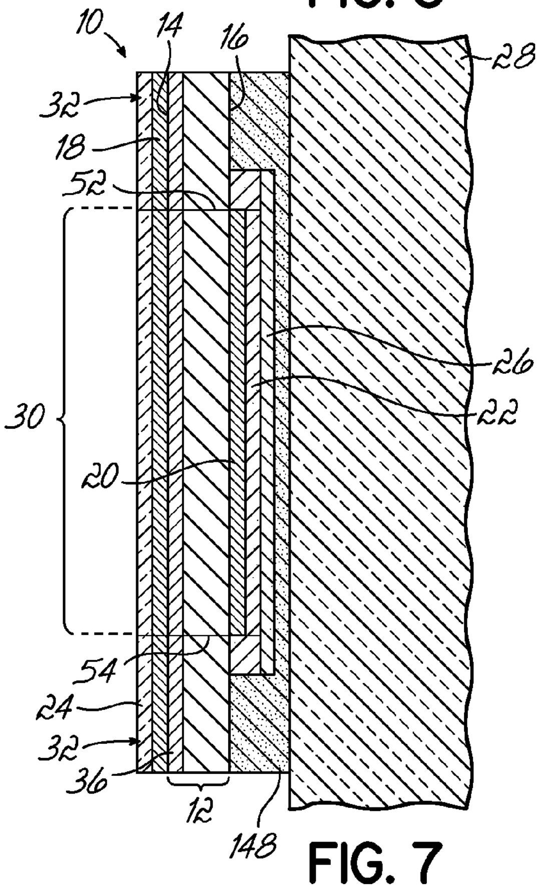
FIG. 7 is a cross-sectional view of an alternate exemplary embodiment of a label having a removable section associated with an outer surface of an article, in accordance with aspects of the present invention.

As described above, the first abhesive layer 22 may be printed generally in substantial registry with the removable section 30 of the substrate 12. Such a removable section 30 may be defined by at least one set of perforations 34 transecting the substrate 12. Thus, in one embodiment (for example, as shown in FIG. 3), the removable section 30 may be defined by first and second perforation lines 52, 54 transecting the substrate 12. However, by being in "substantial registry," it is not mandatory that the abhesive cover only the removable section 30 (i.e., defined by the boundary of any at least one set of perforations 34). Rather (and referring particularly to FIG. 3), the first abhesive layer 22 may be printed in substantial registry by overlapping any at least one set of perforations 34, such that some amount of abhesive may be coated onto any remainder section or sections 32 of the label 10. However, as will be recognized by those of ordinary skill in the art, an adhesive will also be applied to the remainder sections 32 of the label 10, and this adhesive will be in an amount to retain the remainder sections 32 with the article 28 during and after removal of the removable section 30. One particular embodiment includes a first perforation line separating the label into removable section that comprises approximately 65% of the label, and a remainder section that comprises approximately 35% of the label.

The label 10 may further include a protective layer 24 (such as a varnish) disposed on the front side 14 of the substrate 12. Any such protective layer 24 may operate as a protective surface and to improve processing. For example, wax can provide optical clarity. Further, the protective layer can result in better and more consistent die-cutting of the labels once formed. In one particular embodiment, the protective layer may be an overprint varnish including an acrylic emulsion resin, an acrylic solution resin, polyether modified dimethylpolysiloxane, a surfactant, and polyethylene wax. Such an overprint varnish is commercially available from Flint Group, of Lebanon, Ohio. This protective layer can make the label more slick and lubricious, thereby allowing it to more through the die-cutting operation better than prior labels, and labels without such a protective layer. For example, a particular protective layer available from Flint Group, of Lebanon Ohio, is TTW-233116, which has a formulation of 40-50% acrylic polymer, 10-17% PE wax, 8-13% acrylic solution resin, 1-3% surfactant, and 0.5-1% polyether modified dimethylpolysiloxane. As will be recognized by those of ordinary skill in the art, this formulation is merely exemplary of a formulation for protective layers that may be used in the various aspects of the present invention.

As described above, the label 10 may include a first layer 22 of an abhesive disposed on or proximal to the second ink layer 20. Still further, the label 10 may include a second abhesive layer 26 disposed on or proximal to the first layer 22 of abhesive (on the side of the first abhesive layer 22 that is opposite the second ink layer 20). The second abhesive layer 26 may be applied in the same manner, and may include the same composition as the first abhesive layer 22. Alternatively, the second abhesive layer 26 may be disposed in a different manner, different location(s), etc. than the first abhesive layer 22, and may be of a different composition than the first abhesive layer 22. The second abhesive layer 26 may be present in an amount in a range of 1.25-1.75 lbs./ream. In embodiments including more than one abhesive layer, the layers may or may not be printed over the same amount of the label 10 or with the same pattern. In one particular embodiment, the abhesive of the second abhesive layer 26 includes a polyamide resin, polyether modified dimethylpolysiloxane, polyethylene wax, and paraffin wax. Such an abhesive is Abseal™, commercially available from Flint Group, of Lebanon, Ohio.

Figure 8:
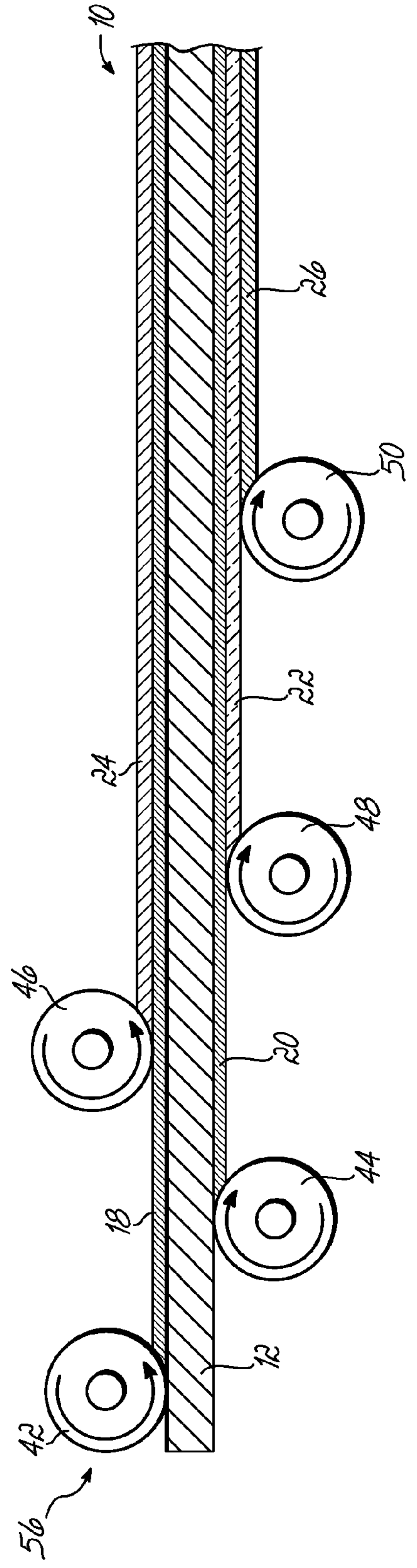
FIG. 8 is a schematic depicting an exemplary method of preparing labels in accordance with aspects of the present invention.

The printing of various layers onto the substrate 12 (e.g., first ink layer 18, protective layer 24, second ink layer 20, first layer of abhesive 22, and second layer of abhesive 26) may be accomplished in one pass through a press 56 (as is shown in FIG. 8). Referring now to FIG. 8, a substrate 12, as described above, can be seen progressing through the press 56 to apply various layers of the label. In particular, the substrate 12 first passes through first and second gravure cylinders 42, 44, which apply the first and second ink layers 18, 20 to the substrate 12. A third gravure cylinder 46 then applies the protective layer 24 over the first ink layer 18. Fourth and fifth gravure cylinders 48, 50 apply the first and second abhesive layers 22, 26 over the second ink layer 20. While the schematic depicted in FIG. 8 shows the various layers being applied to the substrate via gravure cylinders, it will be recognized by those of ordinary skill in the art that this is merely one exemplary method of applying layers to a substrate to form a label, and other standard methods known to those skilled in the art may be used. Further, while the illustrated embodiment depicts all layers as being applied during one pass through a press 56, this is not necessary. For example, the abhesive (either the first or second layer 22, 26, or just the second layer 26) can be printed on a second pass through the press 56. The end result is a plurality of labels 10 including printed indicia on both sides of the substrate 12.

Figure 9:
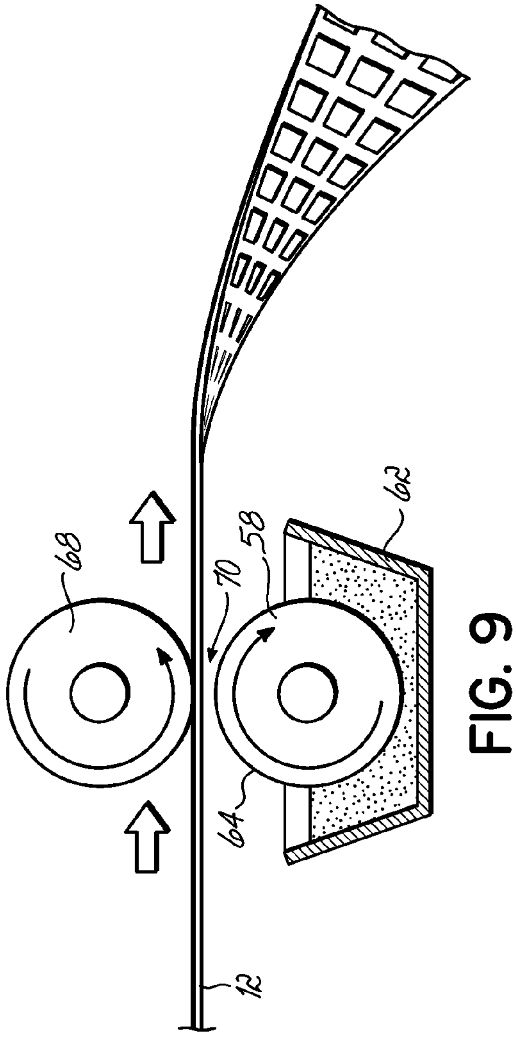
FIG. 9 is a schematic of a gravure cylinder used in an exemplary method of preparing labels in accordance with aspects of the present invention.

As described above as an example, and referring now to FIG. 9, the various layers can be applied using a gravure cylinder 58. While, as described above, the particular use of gravure cylinders is not necessary, and other methods of application may be used, the following is a description of how a gravure cylinder may be used to apply the first abhesive layer 22. Gravure printing units are known to those skilled in the art. Gravure printing units include a rotary press that includes a tray 62, which is filled with the abhesive. A gravure cylinder 58 (the outer surface 64 of which has gravure cells (not shown) for taking up the abhesive), is mounted so that it can rotate at least partially within the tray 62 in such a way that, as it is rotating, while the press 56 is running, it dips into the abhesive so that the gravure cells are filled with the abhesive. Substantially perpendicularly above the gravure cylinder 58, an impression roller 68 is mounted rotatably for rotating opposite to the direction of the rotation of the gravure cylinder 58. The impression roller 68, together with the gravure cylinder 58, forms a roller gap 70 therebetween, through which the substrate 12 and ink layers 18, 20, which are to be printed with abhesive, is passed during the operation of the press 56 in order to take up abhesive from the gravure cells on the outer surface 64 of the gravure cylinder 58.

For carrying out the process, excess abhesive on the gravure cylinder 58 may be stripped from the outer surface 64 thereof with the help of a doctor blade (not shown) or other stripping device, which engages the outer surface 64, thereby leaving abhesive in the etched gravure cells. Afterwards, in the roller gap 70, the abhesive is drawn from the gravure cells of the outer surface 64 by means of the impression roller 68 exerting an elastic counterpressure and is taken up by the substrate 12.

Referring back to FIGS. 1-7, the label 10, in one embodiment, further includes at least one set of perforations 34. As is known to those of ordinary skill in the art, "perforation" refers to the puncturing of a material with a harder (usually sharp) object to create an aperture or indentation. And, in particular, perforation refers to the practice of creating a long series of holes or indentations so that paper can be torn more easily along this "perforation line." As used herein, a "perforation" will generally refer to a single aperture or indentation that is created in a label. And, as used herein, a "set of perforations" will generally refer to a plurality of apertures or indentations that are grouped together, such as in a perforation line (although it will be recognized by those of ordinary skill in the art that such a set of perforations need not be linear, but rather must merely be grouped to facilitate a tearing along the perforations of the set of perforations).

The at least one set of perforations 34 may define, or partially define, the removable section 30 of the label 10. And, the at least one set of perforations 34 may facilitate removal of the removable section 30 from the remainder of the label 10 (i.e., from the remainder section or sections 32). The at least one set of perforations 34 may form a single perforation line transecting the substrate 12, such that a removable section 30 is defined on one side of the single perforation line, while the remainder of the label 10 on the opposite side of the single perforation line 34 remains associated with the article 28 (such as by adhesion thereto). Alternatively, a plurality of sets of perforations 34 may transect the substrate 12, for example. Thus, in such an alternative embodiment, the label 10 may include a first set of perforations forming a first perforation line 52 transecting the substrate 12, and a second set of perforations forming a second perforation line 54 transecting the substrate 12, the first and second perforation lines 52, 54 not being collinear. In this alternative embodiment, the removable section 30 may be defined in the region between the first and second perforation lines 52, 54, while the portions of the label 10 not between the first and second perforation lines 52, 54 (i.e., remainder sections 32) remain associated with the article 28 following removal of the removable section 30. (Those skilled in the art will recognize that there may be more than one removable section, such as by having the two sections of the label not between the first and second perforation lines 52, 54 being removable, while the portion of the label 10 between the first and second perforation lines remains with the article 28.) In yet a further alternative embodiment, at least a third perforation line (not shown) may be made perpendicular to the first perforation line or first and second perforation lines. And still further, a fourth perforation line (not shown) may be made perpendicular to the first perforation line or first and second perforation lines, and not collinear with the third perforation line. As a consequence, the label 10, in this alternate embodiment, is provided with a substantially quadrilateral perforated area that is removable. Those skilled in the art will recognize that the above embodiments are merely exemplary, and one of ordinary skill in the art may configure the number and shape of sets of perforations in any manner to produce a desired removable section or sections.

Figure 10:
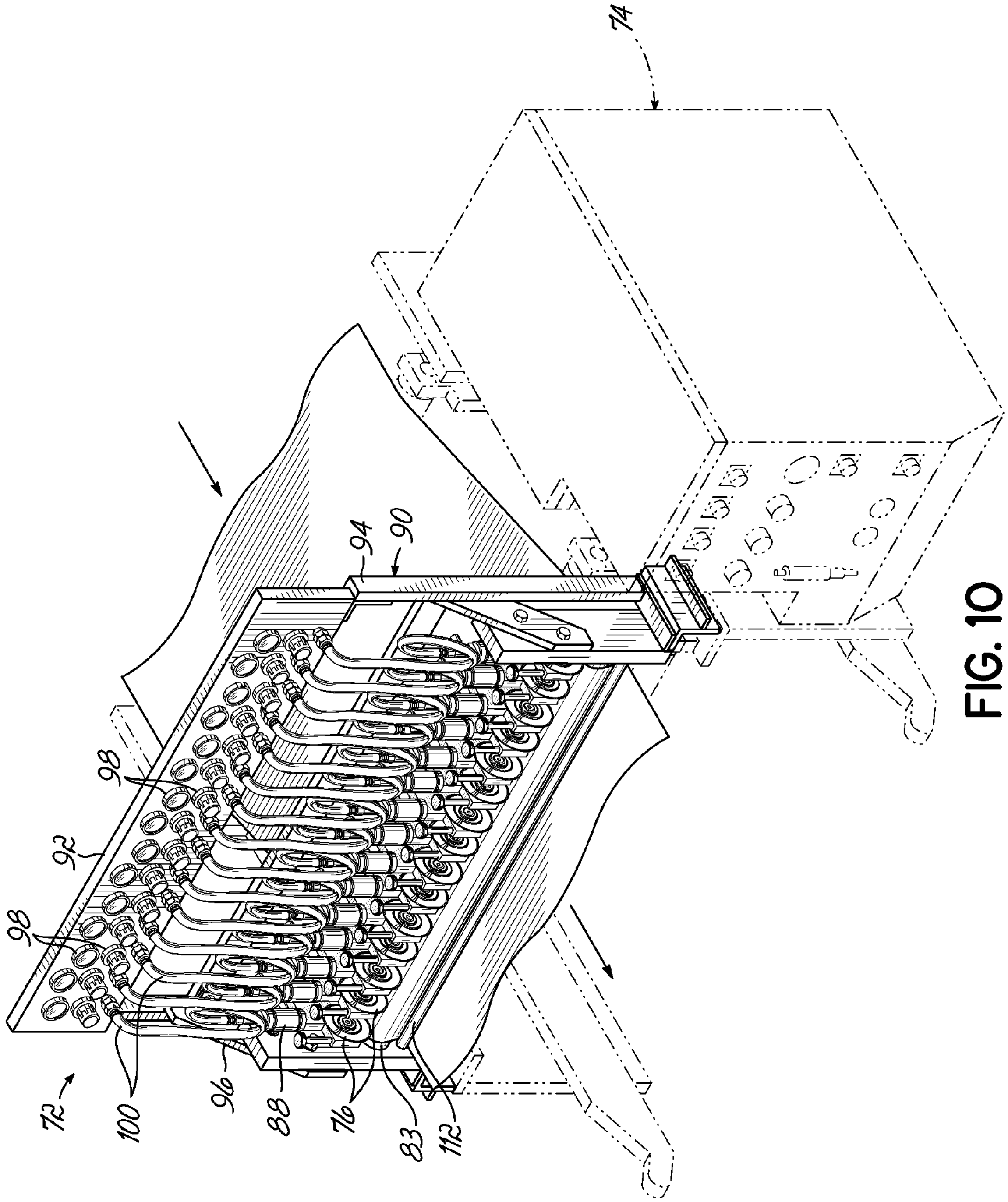
FIG. 10 is a perspective view of a perforating apparatus used to perforate labels in accordance with the aspects of the present invention.
Figure 11:
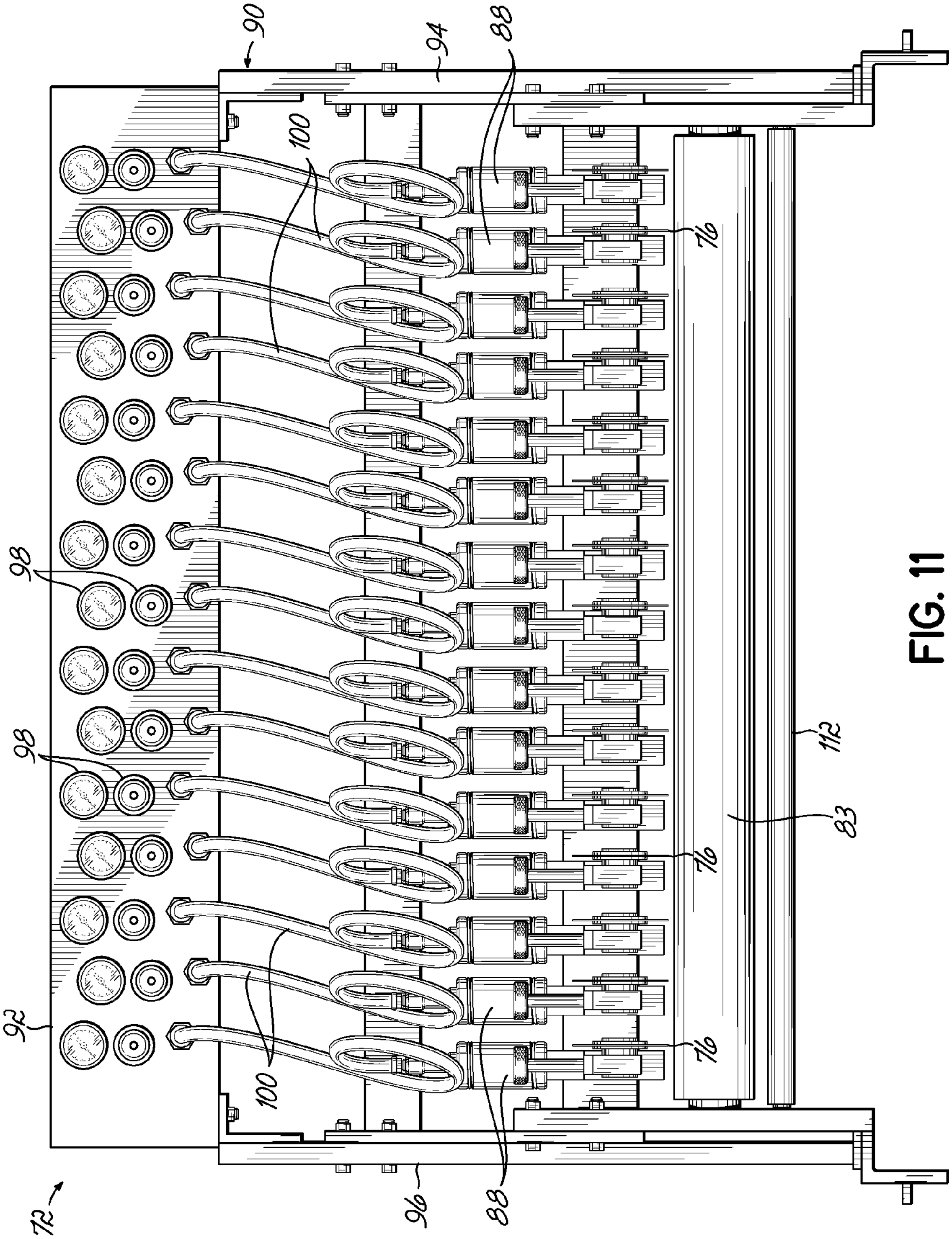
FIG. 11 is a front view of the perforating apparatus of FIG. 10.
Figure 12:
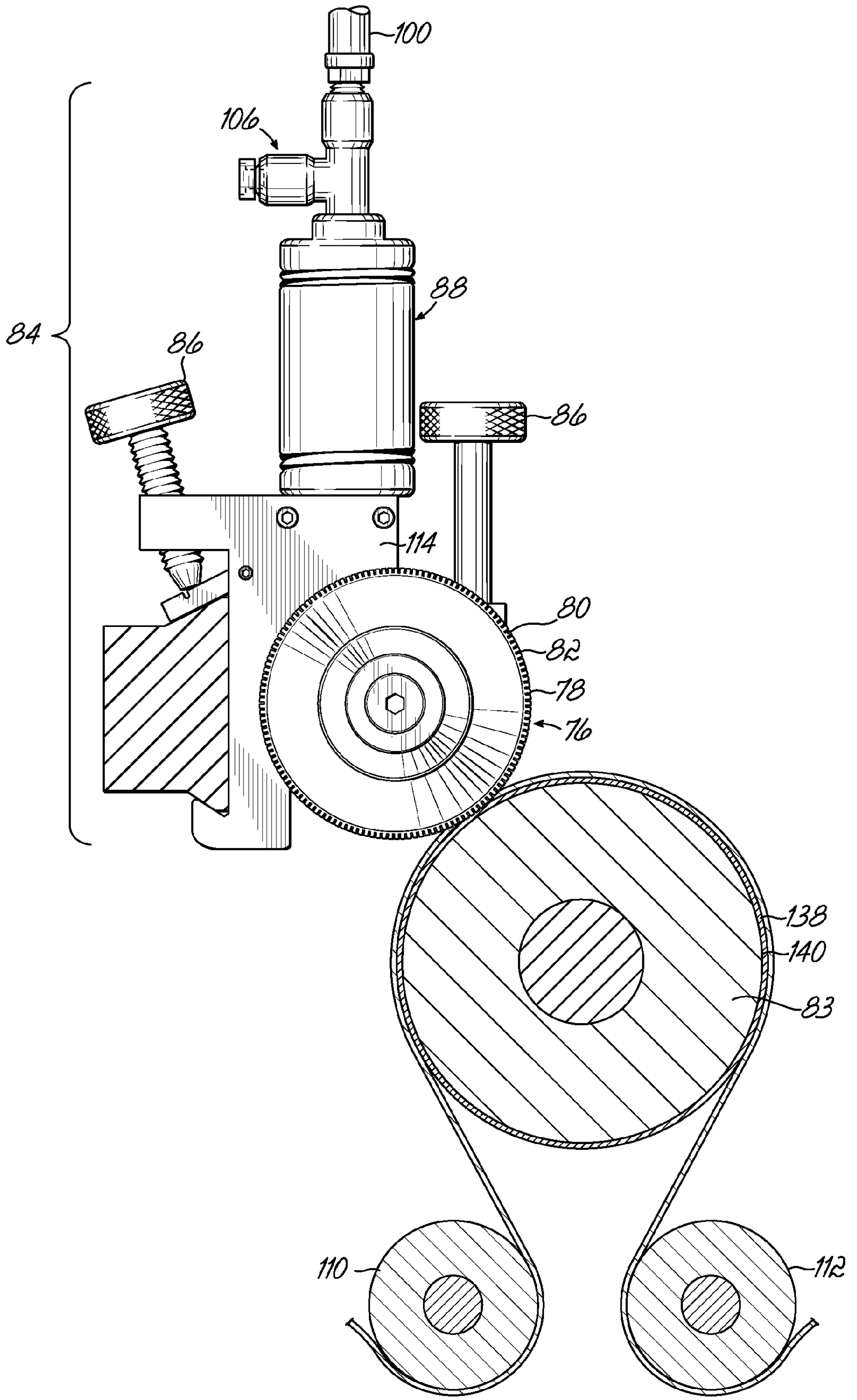
FIG. 12 is a partial cross-sectional view depicting an exemplary perforation assembly in conjunction with rollers of the perforating apparatus, in accordance with aspects of the present invention.

As described above with reference to FIG. 8, the labels are printed on a press (possibly in one pass) with the first ink layer 18 and protective layer 24 (e.g., overprint varnish) being disposed on the front side 14 of the substrate 12 (such as by gravure cylinders 58—or other methods known to those skilled in the art), and with the second ink layer 20, first abhesive layer 22, and/or second abhesive layer 26 being disposed on the back side 16 of the substrate 12 (again, such as by gravure cylinders 50—or other methods known to those skilled in the art). After printing of these layers (e.g., first ink layer 18, protective layer 24, second ink layer 20, first abhesive layer 22, and/or second abhesive layer 26), and referring now to FIGS. 10-13, the labels 10 may be perforated on a perforating apparatus 72. This perforating apparatus 72 may be in-line with the press 56, such that after the various layers are printed onto the substrate 12 to form the labels 10, the labels 10 are then perforated before they exit the press 56. Alternatively, the perforating apparatus 72 may be associated with a separate apparatus from the press 56. For example, the perforating apparatus may be associated with a slitter/rewinder 74 (see particularly FIG. 10). Finally, the perforating apparatus 72 may not be associated with, positioned on, or attached to the press or any other apparatus, but may be a separate stand-alone perforating apparatus. In the illustrated embodiment of FIG. 10, the labels 10 are shown as being perforated on a slitter/rewinder 74. However, this is merely exemplary, and the present invention is not limited to perforations being formed in a perforating apparatus 72 associated with a slitter/rewinder 74.

As is known to those of ordinary skill in the art, a slitter/rewinder 74 includes straight or circular blades (not shown), to cut material into narrow strips. Thus, in the present invention, a web of labels 10 (e.g., a sheet 30 inches wide that will be cut into many narrower strips of labels) is run through the slitter/rewinder 74. The cutting blades (not shown) of the slitter/rewinder 74 are set to a width that is desired for the labels 10. Once the web of labels 10 is fed through the slitter/rewinder 74 and slit into narrower strips, rollers (not shown) on the exit side of the slitter/rewinder 74 rewind the cut material. In the illustrated embodiment, the perforating apparatus 72 is a separate apparatus that can be associated with (e.g., positioned relative to, such as by being placed onto, for example) the slitter/rewinder 74 in order to adapt the slitter/rewinder for perforating a web of labels 10.

Perforations, in and of themselves, are known and are made in ways known to those of ordinary skill in the art. For example, in one general and exemplary method, an infeed roller directs a web of labels into a perforation apparatus, and a draw roller disposed generally "downstream" from the infeed roller pulls the web of labels through the perforation apparatus. Positioned between the infeed and draw rollers are one or more perforating wheels 76 (the number of wheels can be altered depending on the number of perforation lines desired). The outer circumferential surface 78 of each perforating wheel 76 is provided with a plurality of "knives" 80, which serve to puncture the web of labels 10 as it passes, thereby providing the desired perforations. In other words, the outer circumference 78 of the perforating wheels 76 defines a series of protrusions 80 that are capable of puncturing or indenting the web of labels 10. Each of the protrusions are separated by a portion 82 of the outer circumference 78 of the wheel 76 that does not include any protrusion, such that any substrate 12 is not punctured or indented by the non-protrusion portion 82 of the outer circumference 78 of the perforating wheels 76. Proximal to the perforating wheels 76 is a secondary roller 83. The web of labels 10 is stretched taut over the secondary roller 83 and passes between the perforating wheels 76 and the secondary roller 83. The "knives" 80 of the perforating wheels 76 puncture the labels 10 as the web passes between the perforating wheels 76 and secondary roller 83.

During the perforation of labels 10, the penetration depth of the knives 80 may be adjusted, so that it is possible to make the desired perforation. In particular, when implementing types of perforation in which the perforating knives 80 are only intended to partly penetrate (i.e., indent) the labels 10, it is especially important to adjust the penetration depth of the knives 80 of the perforating wheels 76 into the labels 10. The very minute tolerances involved become clear when one considers that the thickness of the labels 10 may be as little as 0.06 mm and thinner.

Referring to FIGS. 10-13, the position of the perforating wheels 76 relative to the secondary roller 83 may be mechanically adjusted using set screws 86, and air pressure is used to set the depth to which the perforating wheel(s) will cut (for example, as provided by a pneumatic cylinder 88). Prior perforating apparatus also used perforating assemblies including a perforating wheel or plurality of perforating wheels that were each associated with a pneumatic cylinder for controlling the pressure applied to the perforating wheels when making perforations. However, in those prior apparatus, and as described in the Background, a single air hose provided the air for the pressure of all of the pneumatic cylinders. As described above, this resulted in drawbacks that the pressure may not be constant for each perforating wheel within the apparatus, due to differences in age between the various cylinders, differences in tolerances due to manufacturing, different amount of build-up or blockages amongst the cylinders, etc. Further, such a configuration requires that only one pressure can be set for all perforating assemblies associated with a single perforating apparatus.

However, the perforating apparatus 72 of one aspect of the present invention includes components that allow for the pressure delivered to each of the pneumatic cylinders 88 of the perforating assemblies 84 to remain constant at the set desired level. To that end, and referring now to FIGS. 10-13, there are shown therein components of a perforating apparatus 72 according to the present invention. In particular, the perforating apparatus 72 is shown, in the exemplary illustrated embodiment, as an apparatus that can be placed onto a standard slitter/rewinder. The perforating apparatus includes a frame 90 for supporting other components of the apparatus; a flow valve panel 92 extending between first and second sides 94, 96 of the frame 90; a plurality of flow control valves 98 positioned on the flow valve panel 92; a plurality of air hoses 100 having first and second ends 102, 104, with each of the first ends 102 associated with one of the plurality of flow control valves 98; a plurality of air mufflers 106, wherein each one of the plurality of air mufflers 106 is attached to a second end 104 of one of the plurality of air hoses 100; a plurality of pneumatic cylinders 88, wherein each pneumatic cylinder 88 is operatively connected to one of the plurality of air mufflers 106; a plurality of perforating wheels 76, wherein each perforating wheel 76 is operatively connected to one of the plurality of pneumatic cylinders 88; at least one idler roller 110, and a secondary roller 83.

The slitter/rewinder 74 includes an infeed roller (not shown) disposed proximal to a first end thereof, and a draw roller (not shown) disposed proximal to a second end thereof. The perforating apparatus 72 of the illustrated embodiment is positioned relative to the slitter/rewinder 74 such that it is operatively disposed along the path of travel of any web of labels 10 between the infeed roller and draw roller. As is shown in the Figures, the web of labels 10 proceeds around a first idler roller 110, around the secondary roller 83, and around a second idler roller 112. Before the web of labels encounters the first idler roller 110, it encounters the infeed roller of the slitter/rewinder. After the web of labels encounters the second idler roller 112, it encounters the draw roller of the slitter/rewinder 74. The draw roller of the slitter/rewinder is connected to a drive motor (not shown) such that the web of labels is pulled through the slitter/rewinder 74 and perforating apparatus 72.

As is described above, the apparatus includes a plurality of perforating wheels. The perforator wheels 74 each are formed with a plurality of spaced perforating knives 80 around the outer circumferential surface of each of the perforating wheels. The knives 80 are provided with relatively sharp cutting edges. The knives 80 are adapted to be pressed against the label 10. As a result, each perforating wheel is adapted to form a set of perforations in the label 10 as it passes between the perforator wheel 76 and secondary roller 83. As shown in the figures, the perforating wheels 76 of the illustrated embodiment will form longitudinal perforation lines. However, those of ordinary skill in the art will recognize that perforations lines of other directions (e.g. latitudinal), or sets of perforations of shapes other than lines, may be formed. In particular, the perforation wheels 76 are attached to holders 114 that may be adjusted such that the knives 80 of the perforating wheels 76 will perforate to a set depth.

More specifically, by means of a perforating wheel 76, which is rotatably mounted on a holder 114, a set of perforations 34 is made in the web of labels 10 that is moving between the perforating wheel 76 and the secondary roller 83. Thus, one perforating wheel will make one set of perforations in a label. As can be seen in the illustrated embodiment of the figures, the perforating apparatus 72 includes a plurality of perforating wheels 76. Thus, a plurality of sets of perforations 34 can be made across a web of labels 10. As is known to those of ordinary skill in the art, a web of labels 10 will include many rows of labels 10 across the web. And since each of the perforating wheels 76 is individually positionable relative to the web of labels 10, the number of sets of perforations 34 per label 10 can be controlled. Thus, each label 10 may have one set of perforations 34 (such as a perforation line 52) transecting the label, or each label may have multiple sets of perforations 34 (such as two or more perforation lines 52, 54 transecting each label.

As described above, each perforating wheel 76 is associated with a pneumatic cylinder 88 that allows for a particular pressure (e.g., air pressure) to be supplied, such that the knives 80 of the perforating wheel 76 can contact and perforate the web of labels 10 at a particular desired pressure. As is known to those of ordinary skill in the art, pneumatic cylinders 88 are mechanical devices which produce force, often in combination with movement, and are powered by compressed gas (e.g., air). The pneumatic cylinders impart a force by converting the potential energy of compressed gas into kinetic energy due to the pressure gradient established by the compressed gas being at a greater pressure than the atmospheric pressure. The air in the cylinder 88 thus expands, and this air expansion forces a piston 116 to move in a desired direction. As is known to those of ordinary skill in the art, pneumatic cylinders 88 may be adjusted so as to control the amount of extension and/or retraction of the piston 116 once actuated. The piston 116 is operatively coupled to the perforating wheel 76 (whether directly, or indirectly via a holder 114) such that the wheel 76 may be moved as a result of movement of the piston 116.

Figure 13:
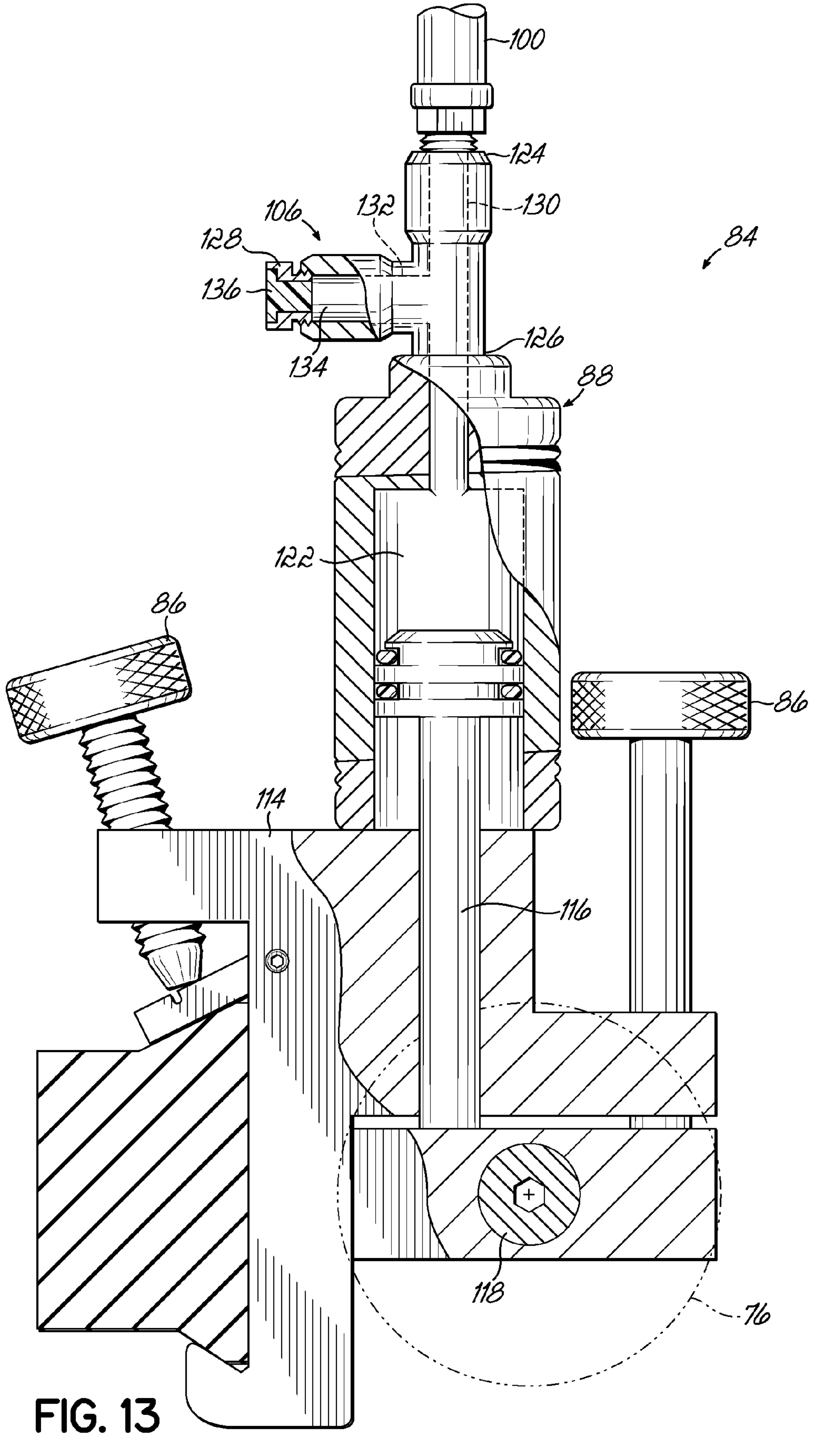
FIG. 13 is a partial cutaway view of the perforation assembly depicted in FIG. 12.

More specifically, and referring now to FIG. 13, a portion of the perforating apparatus 72 that includes an assembly 84 of pneumatic cylinder 88 and perforating wheel 76 is shown in cross-section. The assembly also includes a holder 114, which serves to hold the perforating wheel 76, and set screws 86, which are used to mechanically position the perforating wheel 76 at a desired location relative to any web of labels 10 to be passed through the perforating apparatus 72. The holder 114 has an axle 118 to which the perforating wheel 76 can be fastened in a rotatable manner. The holder 114 is operatively connected to a piston of the pneumatic cylinder, such that it may be cooperatively moved along with the piston 116 during movement of the piston 116. For rectilinear guidance of movement, guide bushes (not shown) may be provided to prevent a rotation of the holder 114 about the axis of the piston 116. The piston 116 and consequently the perforating wheel 76 are moved downward by pressure, in particular, air pressure, being admitted to an air space 122 within the pneumatic cylinder 88, while the piston 116 is fixed in position. The resulting pressure is transmitted to the piston 116, and, as a result, the piston 116 is moved downward, thereby cooperatively moving the perforating wheel 76 downward.

As described above, each wheel of the plurality of perforating wheels 76 is operatively connected to one of the pneumatic cylinders 88 of the plurality of pneumatic cylinders 88. And, each of the pneumatic cylinders 88 is, in turn, operatively connected to one air hose 100 of the plurality of air hoses 100. Thus, each assembly 84 of pneumatic cylinder 88, holder 114, and perforating wheel 76, has air individually supplied by its own air hose 100. As a result, certain of the drawbacks of prior perforating apparatus, described in the Background, are eliminated. First, the present perforating apparatus 72 allows for consistent perforation pressures (and thus consistent perforations) across each label. For example, if a label is designed to include first and second perforation lines 52, 54 running parallel and non-collinear to one another, each of the two perforating assemblies 84 making those two perforating lines 52, 54 can be individually set to make sure each is being made with the same amount of pressure being applied. Second, the prior apparatus only allowed for one pressure to be set at any one time for all the perforating assemblies in the apparatus, whereas, due to the individual air supplies for each perforating assembly 84, each perforating assembly 84 can be individually adjusted, and so different pressures may be applied by the multiple perforating wheels 76, if so desired.

Further, during operation of a perforating apparatus 72, the pressure within the pneumatic cylinder 88 itself may not be held constant. Variances in the operation of the apparatus may cause the pressure to fluctuate (i.e., increase or decrease relative to the desired set pressure). This can cause inconsistencies in perforations along each single line of perforations. However, the perforating apparatus of the present invention includes a plurality of air mufflers 106, each air muffler having a first end 124, a second end 126, and a breather vent member 128. In the illustrated embodiment, each one of the plurality of air mufflers 106 is attached at its first end 124 to a second end 104 of one of the plurality of air hoses 100, and the second end 126 of each of the plurality of air mufflers 106 is attached to a pneumatic cylinder 88. Thus, as air travels from an air source (not shown), through the air hose 100, and into the pneumatic cylinder 88, it passes through the air muffler 106, which is disposed between the air hose 100 and pneumatic cylinder 88.

In the illustrated embodiment, the air muffler 106 is of a T-shape. The air muffler includes a first passageway 130 for the air which is defined by the T-pipe, and proceeds along a longitudinal axis from the air hose to the pneumatic cylinder. A branched portion 132 of the T-pipe, that defines a second passageway 134, lies perpendicular to the first passageway 130 (and is in fluid communication therewith). An end of the second passageway 134 opposite from the intersection of the first and second passageways 132, 134 includes a breather vent 128. In one embodiment, the breather vent 128 is a porous bronze element having a filtration rating of 40 microns. Such T-pipes and breather vents are commercially available from the McMaster-Carr Supply Company, of Elmhurst, Ill. The T-pipe can be selected with fittings to match the size of the pneumatic cylinders and air hoses, and the breather vents can be selected to match the fittings of the T-pipe, as known to those of ordinary skill in the art. Additionally, a separate substance 136 may be placed inside the second passageway 134 and proximal to the porous element. For example, a cotton-type substance may be present as part of the breather vent. The air muffler 106 assists in keeping the desired pressure within the pneumatic cylinder constant. For example, should pressures fluctuate by rising in the pneumatic cylinder 88 (above the desired set pressure), the breather vent 128 allows for escape of air to reduce the pressure and maintain it at its set level.

Further, in the perforating apparatus, the outer surface of the secondary roller 83 is hard, as the rollers are generally made of a hard substance, such as steel. As described above, during a perforating operation, the web of labels 10 moves against this hard surface as the "knives" 80 of the perforating wheels 76 puncture the labels 10. However, the hard surface of the secondary roller 83 does not provide any "give," such that the knives 80 may be stopped by the hard surface from puncturing the labels 10 to the desired depth. However, as can be seen in the illustrated embodiment of FIG. 12, the secondary roller 83 of the perforating apparatus 72 of this aspect of the present invention includes a peripheral wrap 138 about its outer circumference 140. This wrap 138 is made of a material that does not have the hardness of steel, and displays some "give," such that the knives 88 of the perforating wheels 76 are not limited in their degree of travel by the peripheral wrap 138. In other words, the knives 80 of the peripheral wheels 76, in an exemplary embodiment, puncture through the web of labels 10, and at least the outer ends of the knives 80 enters into the peripheral wrap 138. For example, the material may be a polymer film. Further, this polymer film may, for example, be chosen from olefin film, cellophane film, and polyethylene terephthalate (PET) film. The film may have a pressure sensitive adhesive on one side that allows the film to adhere to the secondary roller 83. Thus, in one embodiment, the material may be Scotch tape, commercially available from 3M, of St. Paul, Minn. While the above describes use of polymer films such as olefin film, cellophane film, and PET film, it will be recognized by those of ordinary skill in the art that the material is not limited to these films, but may include any other materials that would suffice to allow the knives of the perforating wheels to enter into the peripheral wrap. Further, the thickness of the peripheral wrap 138 about the secondary roller 83 can be of any thickness that suffices to support the necessary degree of travel of the knives 80 of the perforating wheels 76.

Figure 14:
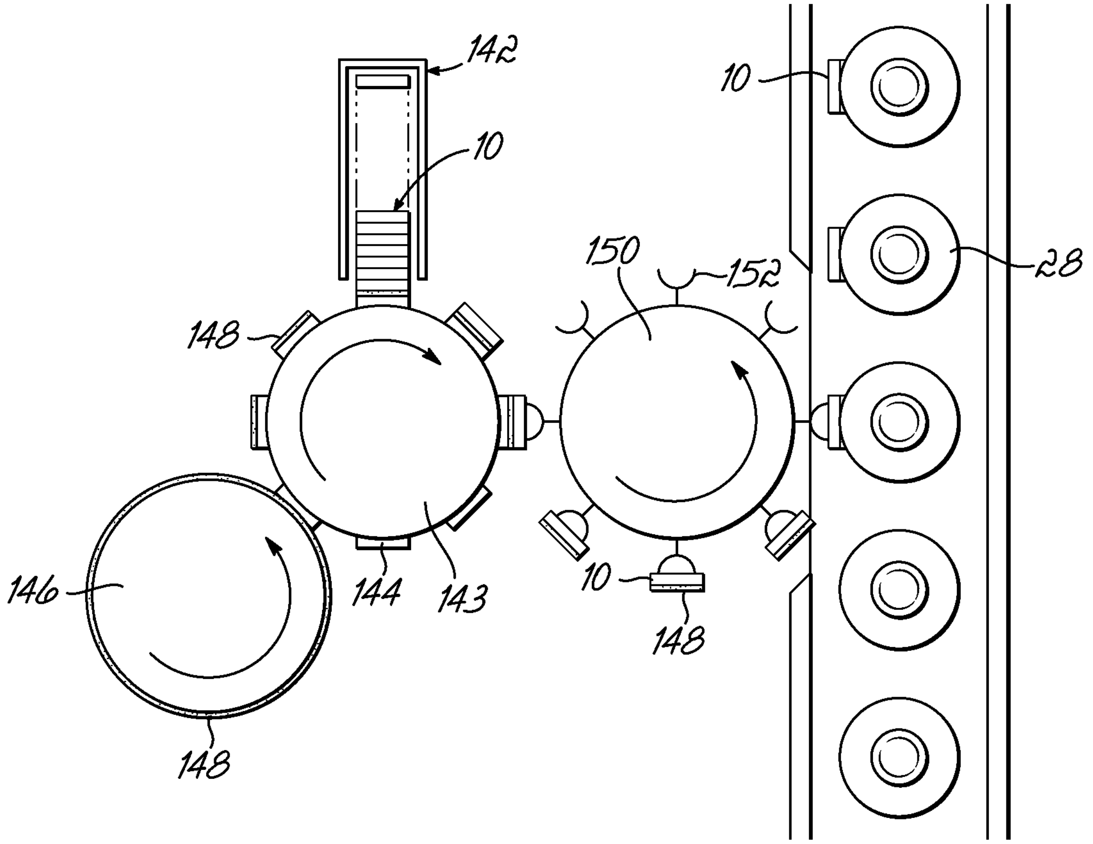
FIG. 14 is a schematic depicting an exemplary apparatus for application of labels to articles in accordance with aspects of the present invention.

Following preparation, the labels 10 may be die-cut for a particular use, or application to a particular article 28. After die-cutting, the label 10 is applied to an article 28. This may be done, for example, on a cold glue, cut-and-stack labeling machine. Referring to FIG. 14, bundles of labels 10 are put in a magazine 142 with the back side 16 of the label 10 exposed. A wheel 143 turns a number of palettes 144. These palettes 144 are steel or rubber and are in the shape of the label 10. This palette 144 comes in contact with a roller 146 containing the glue 148. This glue 148 is sheared onto the palette 144 in a controlled thickness. The glue-containing palette 144 then comes in contact with the back 16 of the label 10, causing the label 10 to be pulled onto the palette 144. The back side 16 of the label 10 is affixed to the object to be labeled through the use of an adhesive 148. Die-cut labels can use conventional wet labeling glue, such as but not limited to, Henkel BL300 for brewery applications, Aqueous adhesives or Hot Melt adhesives from Fuller, Findley, or National Starch and Chemical for wraparound labels, Morton International Aqueous 37P295 or Solvent 33P5 type Gel Lacquer heat activated adhesives or pressure sensitive adhesives such as Nacor 4990 from National Starch and Chemical Company. The palette 144 with the glue-containing label 10 turns toward a "gripper wheel" 150. Fingers 152 on the gripper wheel 150 pull the glue-containing label 10 from the palette 144 and place it on the article 28. The label 10 is then smoothed onto the article 28 with various brushes and rollers 154.

As various changes could be made in the above-described aspects and exemplary embodiments without departing from the scope of the invention, it is intended that all matter contained in the above description shall be interpreted as illustrative and not in a limiting sense.

What is claimed is:

1. A label comprising:

a substrate having a front side and a back side, said back side adapted to be disposed proximal to an article; and an ink composition disposed on the back side of the substrate such that said ink composition is not visible from said front side of the substrate, said ink composition including at least one pigment and a vehicle for said at least one pigment;

wherein said vehicle comprises a mixture of nitrocellulose resin, maleic resin, rosin ester resin, and phosphate plasticizer.

2. The label of claim 1, wherein the vehicle further comprises at least 73% of said ink composition.

3. The label of claim 1, wherein the substrate further comprises a metalized paper.

4. The label of claim 1, wherein the substrate is chosen from a full wet strength paper and a full wet strength metalized paper.

5. The label of claim 1, further comprising a protective layer disposed on the front side of the substrate.

6. The label of claim 5, wherein the protective layer further comprises components chosen from an acrylic emulsion resin, an acrylic solution resin, polyether modified dimethylpolysiloxane, a surfactant, polyethylene wax, and mixtures thereof.

7. The label of claim 1, further comprising a first layer of an abhesive disposed proximal to said ink composition.

8. The label of claim 7, wherein said abhesive further comprises components chosen from a polyamide resin, polyether modified dimethylpolysiloxane, polyethylene wax, paraffin wax, and mixtures thereof.

9. The label of claim 7, wherein the first abhesive layer is present in an amount in a range of 1.25-1.75 lbs/ream.

10. The label of claim 7, further comprising a second layer of abhesive disposed proximal to said first layer of abhesive.

11. The label of claim 10, wherein said abhesive further comprises components chosen from a polyamide resin, polyether modified dimethylpolysiloxane, polyethylene wax, paraffin wax, and mixtures thereof.

12. The label of claim 10, wherein the second abhesive layer is present in an amount in a range of 1.25-1.75 lbs/ream.

13. The label of claim 1, further comprising at least one linear set of perforations transecting the substrate.

14. The label of claim 13, further comprising a first and a second linear set of perforations transecting the substrate, the first and second linear sets not being collinear.

15. The label of claim 14, wherein an abhesive is substantially in registry with a section of the substrate defined between the first and second linear sets of perforations.

16. A combination comprising:

a container, and a cut-and-stack label associated with said container, wherein said cut-and-stack label includes:

a substrate having at least first and second sections, and the substrate further having a front side and a back side, said substrate adapted to receive ink on said front side and said back side; and at least one abhesive layer disposed proximal to said back side of said first section of said substrate, said abhesive layer being disposed as a registered layer; and wherein said at least one abhesive layer confronts said container.

17. A combination comprising:

a container, and a cut-and-stack label associated with said container, wherein said cut-and-stack label includes:

a substrate having at least first and second sections, and the substrate further having a front side and a back side, said substrate adapted to receive ink on said front side and said back side;

a first abhesive layer disposed proximal to said back side of said first section of said substrate;

a second abhesive layer disposed adjacent to said first abhesive layer;

and wherein said second abhesive layer confronts said container.

18. The combination of claim 17, wherein said substrate includes a removable section at center of said substrate with at least one set of perforations above and at least one set of perforations below said removable section.

19. The combination of claim 18, wherein said first abhesive layer is substantially in register with said removable section.

20. The combination of claim 18, wherein said second abhesive layer is disposed adjacent to said first abhesive layer and substantially in register with said removable section.

21. A label comprising:

a paper substrate having at least first and second sections, and the substrate further having a front side and a back side, said substrate adapted to receive ink on said front side and said back side; and at least one abhesive layer disposed proximal to said back side of said first section of said substrate, said abhesive layer being disposed as a registered layer; and wherein said at least one abhesive layer confronts a container when the label is associated with a container.

22. A combination comprising:

a container, and a label associated with said container, wherein said label includes:

a substrate having at least first and second sections, and the substrate further having a front side and a back side, said substrate adapted to receive ink on said front side and said back side; and at least one abhesive layer disposed proximal to said back side of said first section of said substrate, said abhesive layer being disposed as a registered layer;

at least one adhesive layer disposed proximal to said back side of said second section of said substrate, said adhesive layer being disposed as a registered layer; and wherein said at least one abhesive layer confronts said container.

* * * * *

UNITED STATES PATENT AND TRADEMARK OFFICE

CERTIFICATE OF CORRECTION

PATENT NO. : 8,609,211 B2
APPLICATION NO. : 12/433207
DATED : December 17, 2013
INVENTOR(S) : Steve Boucher et al.

It is certified that error appears in the above-identified patent and that said Letters Patent is hereby corrected as shown below:

In the Specification

Column 4,
Line 16 reads “does not result tearing,” and should read --does not result in tearing,--.

Column 6,
Line 5 reads “does not result tearing,” and should read --does not result in tearing,--.
Line 39 reads “exhibit” and should read --exhibits--.

Column 10,
Lines 4-5 read “may include a conventional polyamide inks,” and should read --may include conventional polyamide inks,--.

Column 11,
Line 49 reads “more through” and should read --move through--.

Column 12,
Line 59 reads “is” and should read --are--.

Column 16,
Line 37 reads “54” and should read --54)--.

Column 18,
Line 34 reads “enters” and should read --enter--.

Signed and Sealed this
Second Day of September, 2014

Michelle K. Lee
*Deputy Director of the United States Patent and Trademark Office*